(12) United States Patent
Thesling et al.

(10) Patent No.: US 7,200,185 B2
(45) Date of Patent: Apr. 3, 2007

(54) STAR RECEIVER BURST PROCESSING

(75) Inventors: William H. Thesling, Bedford, OH (US); Mark Vanderaar, Medina, OH (US)

(73) Assignee: ViaSat, Inc., Carlsbad, CA (US)

( * ) Notice: Subject to any disclaimer, the term of this patent is extended or adjusted under 35 U.S.C. 154(b) by 814 days.

(21) Appl. No.: 09/934,299

(22) Filed: Aug. 21, 2001

(65) Prior Publication Data

US 2002/0118737 A1     Aug. 29, 2002

Related U.S. Application Data

(60) Provisional application No. 60/226,655, filed on Aug. 21, 2000.

(51) Int. Cl.
*H03K 9/00* (2006.01)

(52) U.S. Cl. ............. 375/316; 375/226; 375/371; 375/343

(58) Field of Classification Search ............ 375/326, 375/232, 316, 332, 371, 261, 329, 227, 260, 375/145, 149, 364, 368, 340, 148, 346, 140, 375/222, 274; 370/70, 210, 252, 343, 509, 370/513; 348/725; 709/225, 230, 253; 708/313, 708/290; 714/796; 455/73

See application file for complete search history.

(56) References Cited

U.S. PATENT DOCUMENTS

| | | | |
|---|---|---|---|
| 4,232,197 A | 11/1980 | Acampora et al. | |
| 4,599,720 A | 7/1986 | Kunzinger | |
| 4,726,040 A | 2/1988 | Acampora | |
| 5,249,205 A * | 9/1993 | Chennakeshu et al. | 375/348 |
| 5,323,391 A * | 6/1994 | Harrison | 370/210 |
| 5,734,833 A * | 3/1998 | Chiu et al. | 709/225 |
| 5,764,693 A * | 6/1998 | Taylor et al. | 375/222 |
| 5,953,378 A * | 9/1999 | Hotani et al. | 375/341 |
| 6,091,704 A * | 7/2000 | Butash | 370/210 |
| 6,115,433 A * | 9/2000 | de Lantremange | 375/326 |
| 6,201,843 B1 * | 3/2001 | Kingston et al. | 375/350 |
| 6,301,287 B1 * | 10/2001 | Walley et al. | 375/140 |
| 6,421,380 B1 * | 7/2002 | Gu et al. | 375/232 |
| 6,456,653 B1 * | 9/2002 | Sayeed | 375/227 |
| 6,560,294 B1 * | 5/2003 | Gatherer | 375/261 |
| 6,618,452 B1 * | 9/2003 | Huber et al. | 375/343 |
| 6,674,815 B2 * | 1/2004 | Zangi | 375/340 |

(Continued)

OTHER PUBLICATIONS

A fast synchronizer for burst modems with simultaneous symbol timing & carrier phase estimations□□Dengwei Fu; et al.; Circuits & Systems, 2000. Proceedings. ISCAS 2000 Geneva. 2000 IEEE Int'l Symposium on , vol.: 3 , May 28-31, 2000 pp. 379-382.*

(Continued)

*Primary Examiner*—Temesghen Ghebretinsae
(74) *Attorney, Agent, or Firm*—Townsend and Townsend and Crew LLP

(57) ABSTRACT

Architecture for processing a record of burst information in a transmission link. A waveform sampler samples a received waveform containing a record of symbols imposed on a carrier signal. Symbol phase of the record symbols is determined utilizing one or more metrics. Any residual carrier error is corrected, and the carrier signal is removed. The phase and time-of-arrival of the burst information associated with a maximum positive correlation value are then determined.

83 Claims, 6 Drawing Sheets

U.S. PATENT DOCUMENTS 6,754,251 B1 * 6/2004 Sriram et al. ................ 375/145
6,772,181 B1 * 8/2004 Fu et al. ...................... 708/313

OTHER PUBLICATIONS

VLSI implemented ML joint carrier phase and timing offsets estimator for QPSK/OQPSK burst modems□□Yimin Jiang, et al; Wireless Communications & Networking Conference, 1999. WCNC. 1999 IEEE , Sep. 21-24, 1999 □□pp. 742-746 vol. 2.*

Carrier frequency recovery in all-digital modems for burst-mode transmissions□□□□Luise, M et al; Communications, IEEE Transactions on , vol. 43 , Issue: 234 , Feb./Mar./Apr. 1995 pp. 1169-1178.*

Efficient FFT and equalizer implementation for OFDM receivers□□Fechtel, S.A.; Blaickner, A.; Consumer Electronics, IEEE Transactions on □□vol. 45, Issue 4, Nov. 1999 pp. 1104-1107.*

Enhanced symbol synchronization method for OFDM system in SFN channels; Palin, A.; Rinne, J.; Global Telecommunications Conference, 1998. GLOBECOM 98. The Bridge to Global Integration. IEEE vol. 5, Nov. 8-12, 1998 pp. 2788-2793 vol. 5.*

The Communications Handbook; Jerry Gibson; 1997, CRC Press, p. 1230.*

Anthony S. Acampora, et al.; "Baseband Processing in a High-Speed Burst Modem for a Satellite-Switched TDMA System"; IEEE Transactions of Communications, vol., Com-27, No. 10, Oct. 1979; pp. 1496-1503.

Steve Gardner; "Burst Modem Design Techniques, Part I and II"; CSD—Jul. 1999; pp. 1-9.

Robert Howald; "Kicking Off the Communication Link"; Archive; pp. 1-7.

* cited by examiner

STAR RECEIVER BURST PROCESSING

BACKGROUND OF THE INVENTION

This application claims priority under 35 U.S.C. § 119(e) from U.S. Provisional Patent application Ser. No. 60/226,655 entitled "Star Receiver Burst Processing" and filed Aug. 21, 2000.

TECHNICAL FIELD OF THE INVENTION

This invention is related to communication receivers, and more specifically to receivers utilizing burst processing.

BACKGROUND OF THE ART

As the demand for telecommunication bandwidth has grown dramatically in recent years, it has become increasingly problematic to provide cost-effective, continuous connections in many applications that require high, instantaneous throughput due to the inherent presence of bursty information transmissions. Thus, the implementation of multiple-access systems has realized significant growth. These multiple-access systems share channel bandwidth by providing access to users only when they need it.

Burst processing is utilized in a variety of digital cellular communications such as GSM (Global System of Mobile Communications), IS-136 cellular phones and packet data networks. In the data packet regime, accommodating such a technology requires the introduction of a specialized kind of modem called a burst modem that can receive and transmit modulated data packets in short bursts.

An MF-TDMA (Multiple Frequency-Time Domain Multiple Access) architecture is a frequency-hopping access technique where users may transmit on any carrier. An incoming packet is fragmented into cells and transmitted in the user-assigned TDMA slots, or in designated random-access slots. Dependent on how the return link bandwidth is allocated, these TDMA slots could be on different carriers requiring a Very Small Aperture Terminal to "hop" between carriers on a slot-by-slot basis.

In the return link MF-TDMA structure of a satellite transmission system, multiple users each require, essentially, a continuous connection on a common channel, however, the connection is provided by assigning each user a periodic time slot in which to insert data on a channel whose bandwidth is substantially greater than that required by any single user. Each user can then send bursts of data at a specified frequency and during a specific time slot.

In continuous modem applications, the user typically waits a few seconds while the receiver acquires the transmitted signal. However, in a burst modem, where the user data content of a given transmission may only be a fraction of a second, long acquisition times contribute to an unacceptable amount of overhead to the system, and substantially reduce the system capacity. From the modem designer's perspective, it is the channel that substantially alters the received signal from the transmitted signal. Therefore, the burst modem requires an acquisition architecture that quickly filters out channel noise in the incoming signal by rapidly estimating the appropriate receiver gain, the carrier phase and frequency, the sample timing frequency, and phase. For example, in a star return link, transmission bursts of 512 QPSK (Quadrature Phase Shift Keying) symbols are sent. The actual carrier frequency of each burst can vary by as much as 10% of the symbol rate, and the burst arrival time can be early or late by up to eight symbol times.

What is needed is a burst-reception architecture capable of processing records of burst information in the presence of significant channel noise.

SUMMARY OF THE INVENTION

The present invention disclosed and claimed herein, in one aspect thereof, comprises an architecture for processing a record of burst information in a "return" transmission link. Although this architecture works well with most any transmission link, it is best suited for the "return" link of "hub and spoke" system. In such a system, a hub or central node (or gateway) broadcasts data to all users. Each user tracks the continuous broadcast signal from the hub and extracts the information intended for him. This is the "forward link." In contrast, the return link allows for many users (or terminals) to communicate back to the central node. It is common to use a "multi-frequency time division multiple access" (MF-TDMA) access technique to allow the multiple users to share the medium. In such a return link, the gateway return link receiver needs to receive multiple channels and multiple time slots (bursts or records) simultaneously and be able to accurately demodulate each record. In the following gateway receiver, a waveform sampler samples a received waveform containing a record of symbols imposed on a carrier signal. Symbol phase of the record symbols is determined utilizing one or more metrics. Any residual carrier error is corrected, and the carrier signal is removed. The phase and time-of-arrival of the burst information associated with a maximum positive correlation value are then determined.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

The disclosed architecture is an efficient burst reception algorithm capable of processing records of burst information in the presence of significant channel noise. The sampled burst is stored and processed as an entire block. Processing is then performed on the entire block. This "record processing" is superior to conventional "acquire-and-track" processing where a large preamble is utilized to initiate "control loops" for achieving and tracking timing and carrier error.

Figure 1:
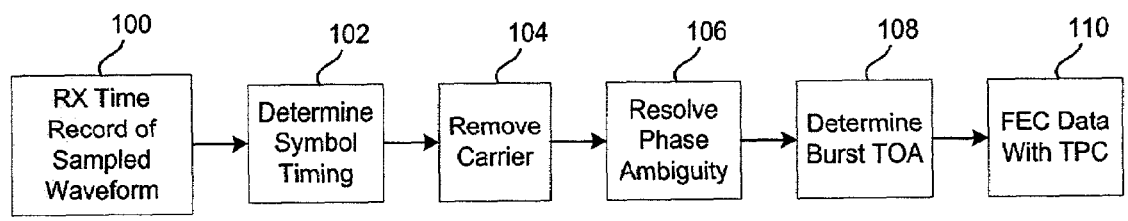
FIG. 1 illustrates a general block diagram of return link burst processing, according to a disclosed embodiment.

Referring now to FIG. 1, there is illustrated a general block diagram of return link burst processing, according to a disclosed embodiment. Generally, the return link allows for variable modulation and coding formats within a MF-TDMA (Multiple Frequency-Time Division Multiple Access) structure. With TDMA, multiple users share access to a common channel, or carrier. The carrier is divided into a set of time slots, N, with a user assigned access to a specific slot (or slots). The technique is efficient in that a single demodulator can be used to recover transmissions from all of the slots of a given carrier.

Upon reception of a time record of a sampled waveform by a receiver, as indicated in a block 100, burst information is passed to a symbol timing determinator block 102 where an optimal sampling point is determined, and interpolation is performed to the optimal sampling point. Next, residual carrier error (if any) is removed in both phase and frequency utilizing estimator and corrector circuitry in a block 104. After the frequency and phase have been corrected utilizing block 104, phase ambiguity of the burst data is resolved in a resolver block 106. After the phase of the data is corrected, the time-of-arrival (TOA) of the burst data is determined utilizing a TOA determinator 108. The data is then ready to be sent to a forward error correction (FEC) decoder 110 for decoding.

Upon completion of these tasks, flow is to a function block 104 where data is presented for forward error correction. In this particular embodiment, one turbo product code (TPC) array is used to carry one such burst, for example, a $(32,26)^2$ TPC. This code is capable of bit error rate (BER) performance of $10^{-5}$ at a channel Signal-to-Noise (SNR) level of Eb/No=1.4 dB. This is less then 2.0 dB from the Shannon limit at this code rate. Thus burst processing needs to function efficiently at this SNR. Simulation results have shown approximately 0.2 dB of degradation associated with the disclosed burst-processing algorithm.

Figure 2:
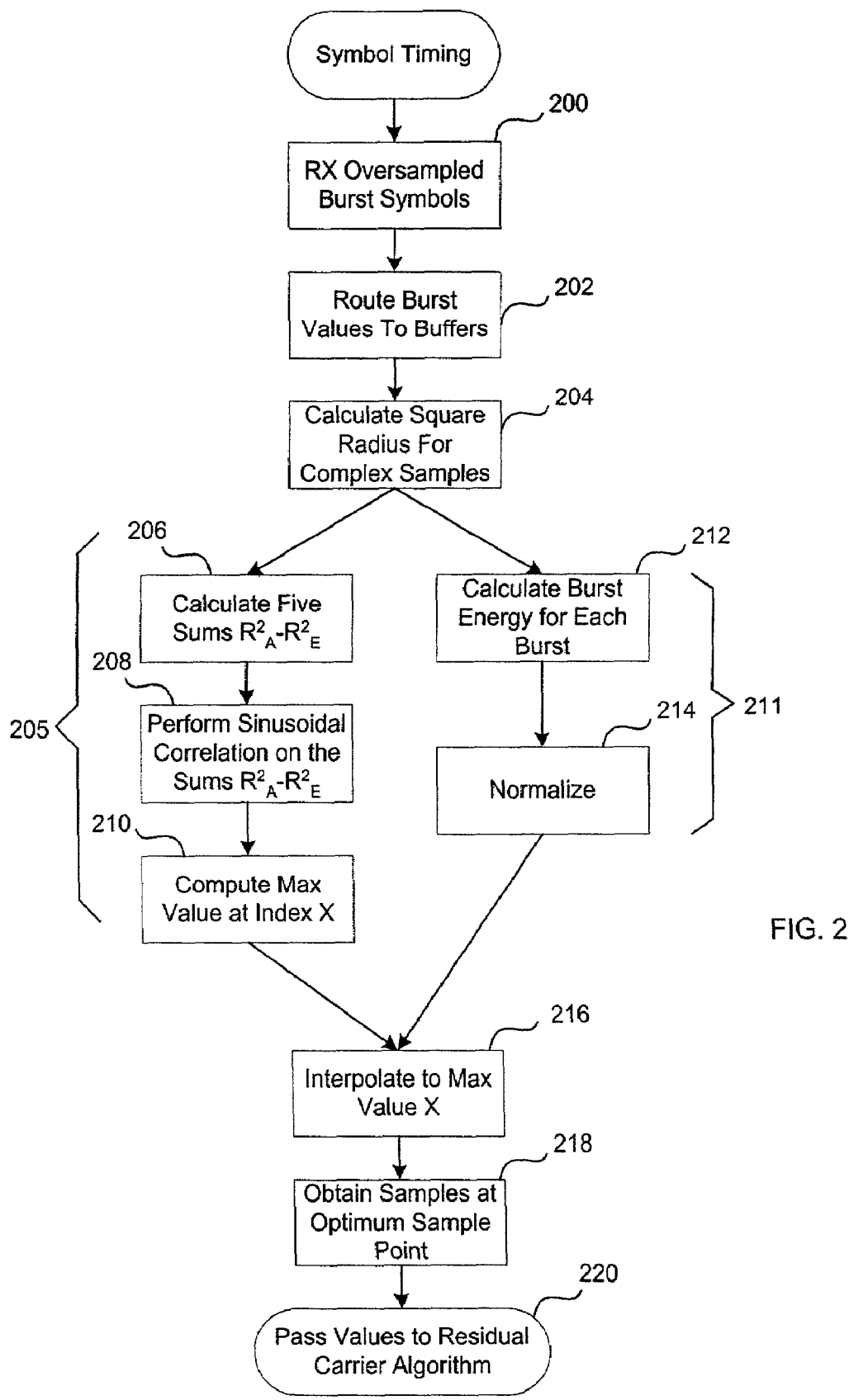
FIG. 2 illustrates a flow chart of the process for obtaining symbol timing.

Referring now to FIG. 2, there is illustrated a flow chart of the process for obtaining symbol timing. The burst-processing algorithm is a type of record processing, and assumes a record of data that largely captures the appropriate time of the data burst. Flow begins at a function block 200, where data is received from a polyphase filter that accommodates up to sixteen channels of burst data. The polyphase filter is a multi-rate filter that decomposes a particular frequency spectrum into sub-bands that can later be used for a variety of processing tasks. Data carried on these sub-bands is then extracted and passed to subsequent circuitry for processing. (Note that other implementations using filters with more channels can also be utilized.) In this example, the output of each channel of the polyphase filter is sampled at a rate that is five times the channel symbol rate (i.e., 5×1.6875 Msps per channel). Other oversampling ratios can be handled in a fashion similar to this example but the sample rate must be greater then twice the symbol rate. Data extracted from the various sub-bands is then routed to corresponding data buffers associated with each channel to reassemble the burst data in burst of 512 symbols, as indicated in a function block 202. As mentioned previously, the 512 burst symbols are oversampled five times yielding 2,560 samples per burst. This rate of oversampling accommodates utilizing the $(32,26)^2$ TPC.

Flow is then to a function block 204 to calculate the square radius $R^2$ for all complex samples i=1, 2, 3 ... n, such that $R_i^2 = I_i^2 + Q_i^2$. It should be noted that the radius R, as opposed to the square radius $R^2$, is a slightly superior metric. However this metric involves the calculation of 2560 "square roots" per burst. In the disclosed example, the square radius $R^2$ was elected for use and works very nearly as well as the radius R. Note that extensions can be made beyond the square radius to a cubed radius $R^3$, and so on. However, the computational requirements begin to impose a significant burden on the system. Flow then splits along a first branch 205 to a function block 206 to calculate five square radii sums $R^2_A$–$R^2_E$ over 512 selected samples for each sum, in accordance with the following equations:

$$R_A^2 = \sum_{i=0,5,10...}^{2555} R_i^2,$$

$$R_B^2 = \sum_{i=1,6,11...}^{2556} R_i^2,$$

$$R_C^2 = \sum_{i=2,7,12...}^{2557} R_i^2,$$

$$R_D^2 = \sum_{i=3,8,13...}^{2558} R_i^2, \text{ and}$$

$$R_E^2 = \sum_{i=4,9,14...}^{2559} R_i^2.$$

After the sums $R^2_A$–$R^2_E$ are calculated, flow is to a function block 208 to determine the sinusoidal correlations utilizing $\cos(2\pi/5)$ and $\sin(2\pi/5)$. Flow is then to a function block 210 to determine the index location X having the maximum value. This correlation operation determines the index (including any fractional part) location having the maximum correlation. This yields the optimal interpolation point for generating the best "sample" per symbol when the best sample point falls between samples. Referring back to function block 204, flow also branches down a second path 211 to a function block 212 to calculate the burst energy $E_{Burst}$ (or in our case the average radius) for each burst processing, in accordance with the following equation:

$$E_{BURST} = \frac{1}{2560} \sum_{i=0}^{5 \times 511} R_i^2.$$

Flow continues to a function block 214 to normalize the particular burst information for all complex samples $I_i$ and $Q_i$, in accordance with the following equations:

$$I = \frac{I_i}{\sqrt{E_{BURST}}}, \text{ and}$$

$$Q_i = \frac{Q_i}{\sqrt{E_{BURST}}}.$$

Both branches 205 and 211 of the symbol timing algorithm then merge at a function block 216 where values calculated during each branch are passed thereto, and an interpolation process is performed to the index value X. Decimation is performed in a function block 218 to obtain 512 samples at the optimum sample point (which achieves one sample per symbol, at the symbol point). The samples are then passed to the next algorithm, the residual carrier algorithm.

As noted hereinabove, the sample rate is five times the symbol rate for each record of data. The symbol timing frequency is "known" to the receiver. The symbol phase is determined as that phase which maximizes the square symbol amplitude. This is accomplished via five banks of adders and a 5-point correlation with the sine and cosine functions ($\cos(2\pi/5)$ and $\sin(2\pi/5)$), if the receiver is 5-times oversampled. (Note that if 2.5-times oversampling is selected, then correlation is with 2.5 points. This is perhaps best accomplished with a 5-point correlation using sinusoidal functions with two cycles over the five samples, as opposed to just one. In general, the signal can be oversampled N times. The 5-point correlation would then be an N-point correlation.) The phase relationship of these sine and cosine correlations yields the optimum (max value) sampling point. Standard interpolation techniques can be employed to achieve "samples" at the optimum sampling point. At this point, the sample rate is reduced from five to one complex sample per symbol. Other metrics besides the square symbol amplitude can be used, and include square symbol amplitude, symbol amplitude, and symbol variance.

Figure 3:
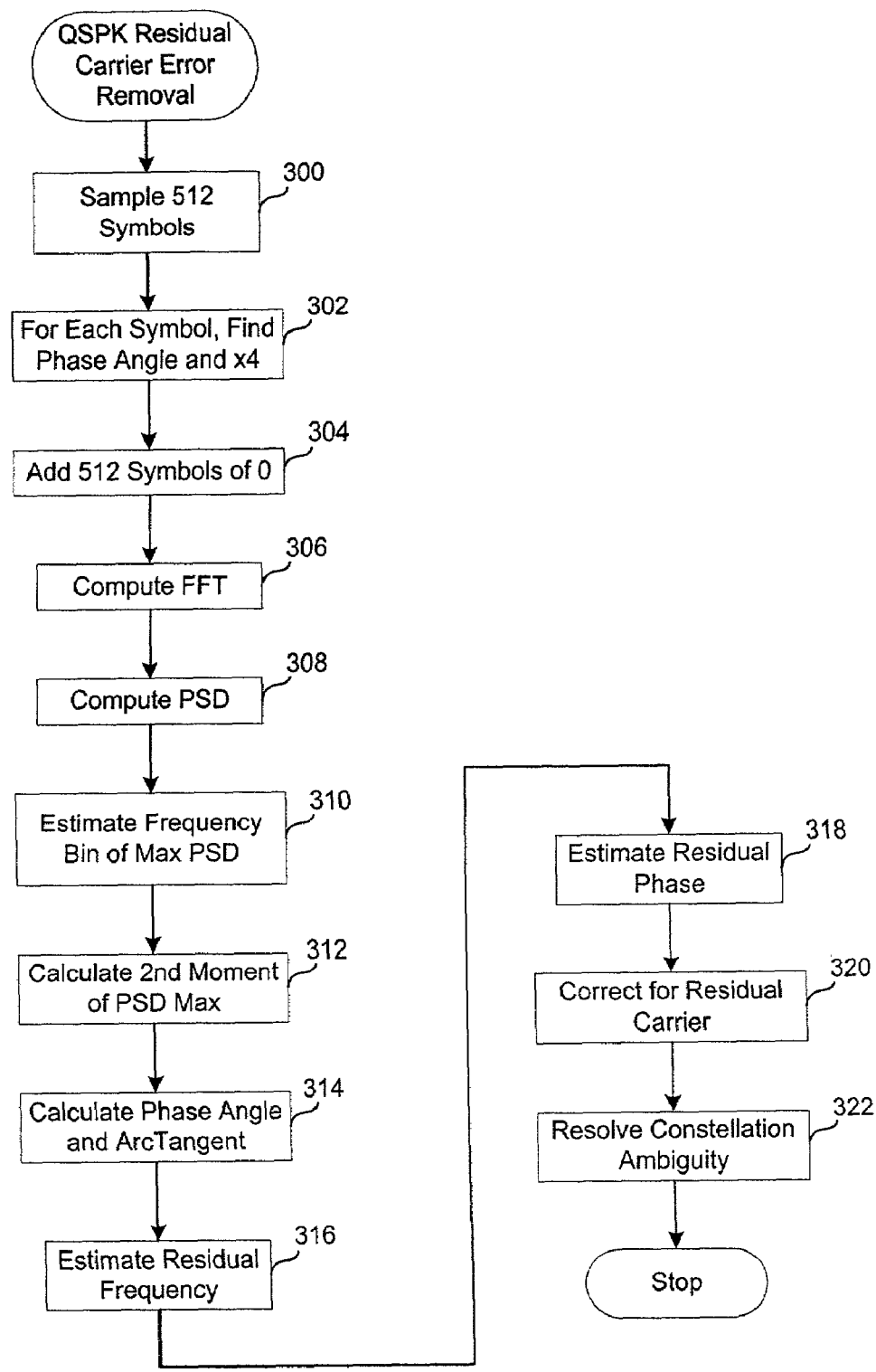
FIG. 3 illustrates a flow chart of the process associated with removal of the residual carrier.

Referring now to FIG. 3, there is illustrated a flow chart of the process associated with removal of the residual carrier. Residual carrier removal requires an estimator that estimates the residual carrier phase and frequency. A down converter is then utilized to remove the residual carrier. The following process can be used for QPSK (Quadrature Phase Shift Key) modulation and can be extended to higher order constellations which exhibit phase symmetry, such as 8-PSK. Flow begins at a function block 300 where the 512 complex samples are received from the symbol-timing algorithm of FIG. 2. (Notably, other implementations may be provided which use greater than 512 samples or less than 512 samples. The choice will depend on a number of design parameters, including the minimum channel operating signal-to-noise ratio, burst size, and system phase noise, just to name a few. Flow continues to a function block 302 where the phase angle θ is found for each symbol, and the phase angle θ is multiplied by 4 (or multiplied by 8, in 8-PSK applications), which multiplication process rotates out the modulation. The change in phase angle can be calculated in real time by using a lookup table (e.g., 256K×32-bit table). Flow continues to a function block 304 to increase the block of symbols from 512 to 1,024 by adding 512 symbols of zero (i.e., complex 0=0+0i), which yields a block of 1,024 symbols. Optionally, the original block of 512 symbols can be sized to include a few extra symbols before and a few extra symbols after (e.g., eight before and eight after) for a total of 512+16=528 symbols. The subsequent addition of 496 symbols of binary 0 then yields the 1,024 complex symbol block. (The FFT of size n=1024 can be smaller or larger. With 512 symbols, 512 will work well, but n=1024 is a better estimator particularly when the true frequency falls between two bins of the FFT.)

Flow continues to a function block 306 where the FFT (Fast Fourier Transform) of the block of 1,024 symbols is computed. The power spectral density (PSD) is then computed by squaring each FFT output point, as indicated in a function block 308, by adding the squares of the imaginary component I and real component Q, i.e., $PSD_f = I_f^2 + Q_f^2$. Flow is to a function block 310 to estimate the average frequency bin at the max PSD, i.e., max [$PSD_f$], which occurs at f=s. The second moment about the max PSD is then calculated (i.e., one frequency bin above, one frequency bin below, and the max), as indicated in a function block 312, and in accordance with the equation, $$f' = (s-1)PSD_{s-1} + (s)PSD_s + (s+1)PSD_{s+1}.$$

Flow continues to a function block 314 to compute the phase angle θ' as the sum of the three real components Q divided by the sum of the three imaginary components I of the three frequency bins from the operation in function block 312, and then compute the arctangent thereof.

$$I = \frac{I_i}{\sqrt{E_{BURST}}}, \text{ and}$$

$$Q_i = \frac{Q_i}{\sqrt{E_{BURST}}}.$$

Flow is then to a function block 316 where the residual carrier frequency is estimated as the frequency f'/4, which is provided in the following equation.

$$\hat{f} = \frac{f'}{4} = \frac{(s-1)PSD_{s-1} + (s)PSD_s + (s+1)PSD_{s+1}}{4}$$

The residual carrier phase angle $\hat{\theta}$ is then estimated as the phase θ'/4, as indicated in a function block 318. The phase and frequency are then corrected as per the estimates associated with function blocks 316 and 318 (i.e., a complex down conversion), as indicated in a function block 320, and in accordance with the following equations:

$$I_{i, \text{frequency corrected}} = I_i \cos(2\pi \hat{f} i + \hat{\theta} + 45°) - Q_i \sin(2\pi \hat{f} i + \hat{\theta} + 45°)$$

$$Q_{i, \text{frequency corrected}} = I_i \sin(2\pi \hat{f} i + \hat{\theta} + 45°) + Q_i \cos(2\pi \hat{f} i + \hat{\theta} + 45°).$$

Constellation points should now be clustered around fixed points at 0°, 90°, 180° and 270°. Although the constellation points are clustered around these points, a 90° ambiguity still exists. Therefore, an optional 45° rotation can be performed which places the constellation points in the center of each quadrant, as indicated in a function block 322. The resulting relationships and values are then used to resolve the phase ambiguity and burst time arrival in the next algorithm.

Figure 4:
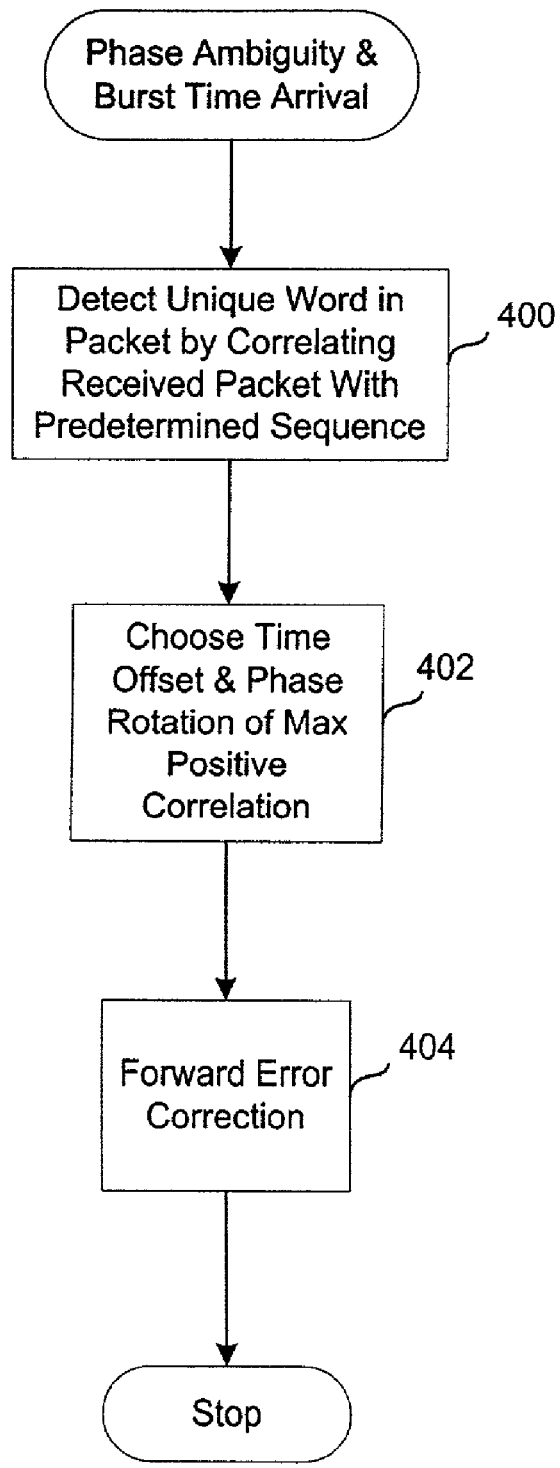
FIG. 4 illustrates a flow chart of a process for resolving the phase ambiguity and burst time arrival.

Referring now to FIG. 4, there is illustrated a flow chart of a process for resolving the phase ambiguity and burst time arrival. Phase ambiguity and burst time arrival are determined together via the location of a unique bit pattern (i.e., a unique word (UW)) inserted into the packet. The UW is chosen to be a (32,26) extended Hamming code code word, and is thirty-two bits (or sixteen symbols) in length. Hence, twenty-six information bits are dedicated to the UW (and are therefore lost for the purpose of carrying information). This represents a relatively low loss due to utilization of the UW, i.e., 26 of $26^2$ bits, or approximately 3.8%. The 16-symbol UW has favorable auto correlation properties with respect to 90° rotations and symbol position offsets (up to ±8 symbols). This criteria is different then "straight" auto correlation. An optimal unique word (one of two) is determined to be:

UW=(0,1,0,1,0,1,0,1,0,1,1,1,1,0,0,0,0,1,1,0,0,1,1,0,0, 1,0,0,1,0,1,1).

Midamble detection (signals in the middle of a sequence already known to the receiver) of the location of the UW is found by correlating the received data with this (symbol) sequence, as indicated in a function block 400. Flow is then to a function block 402 where the time offset (if any) and phase rotation that generated the maximum positive correlation, are chosen. Thirty-four correlations are required per block. There are two correlations per symbol time—one at 0 degrees and another at 90°, rotated. The 180° and 270° rotations result in the negation of these respective correlation values. Correlations with the middle sixteen symbols (midamble) are taken with the unique word symbol sequence, eight symbols early and eight symbols late (with 0 and 90 degree phase shifts), and on time, resulting in thirty-four computed correlations per burst. The largest amplitude is then selected, whether it be positive or negative. The maximum amplitude is then indexed with a time stamp, and the phase angle at the maximum amplitude is also noted. This algorithm can also be modified for block sizes of larger symbol lengths. Phase ambiguity is corrected in accordance with the following equations:

$$I_{i,corrected} = \pm I_{i, frequency\ corrected} \mp Q_{i, frequency\ corrected},$$
and
$$Q_{i,corrected} = \pm I_{i, frequency\ corrected} \pm Q_{i, frequency\ corrected}.$$

Flow continues to a function block 404 where the resulting values are then passed to the forward error correcting decoder at its input rate for decoding. The process then reaches a Stop point.

It can be appreciated that when using the 512-symbol packets, the symbol timing recovery and carrier recovery techniques are efficient. That is, very little degradation in performance with respect to "perfect" symbol timing and carrier information is noted. As the SNR decreases, the synchronization techniques fail just below the point where the forward error correcting code fails. Thus the disclosed algorithms are efficient.

Figure 5:
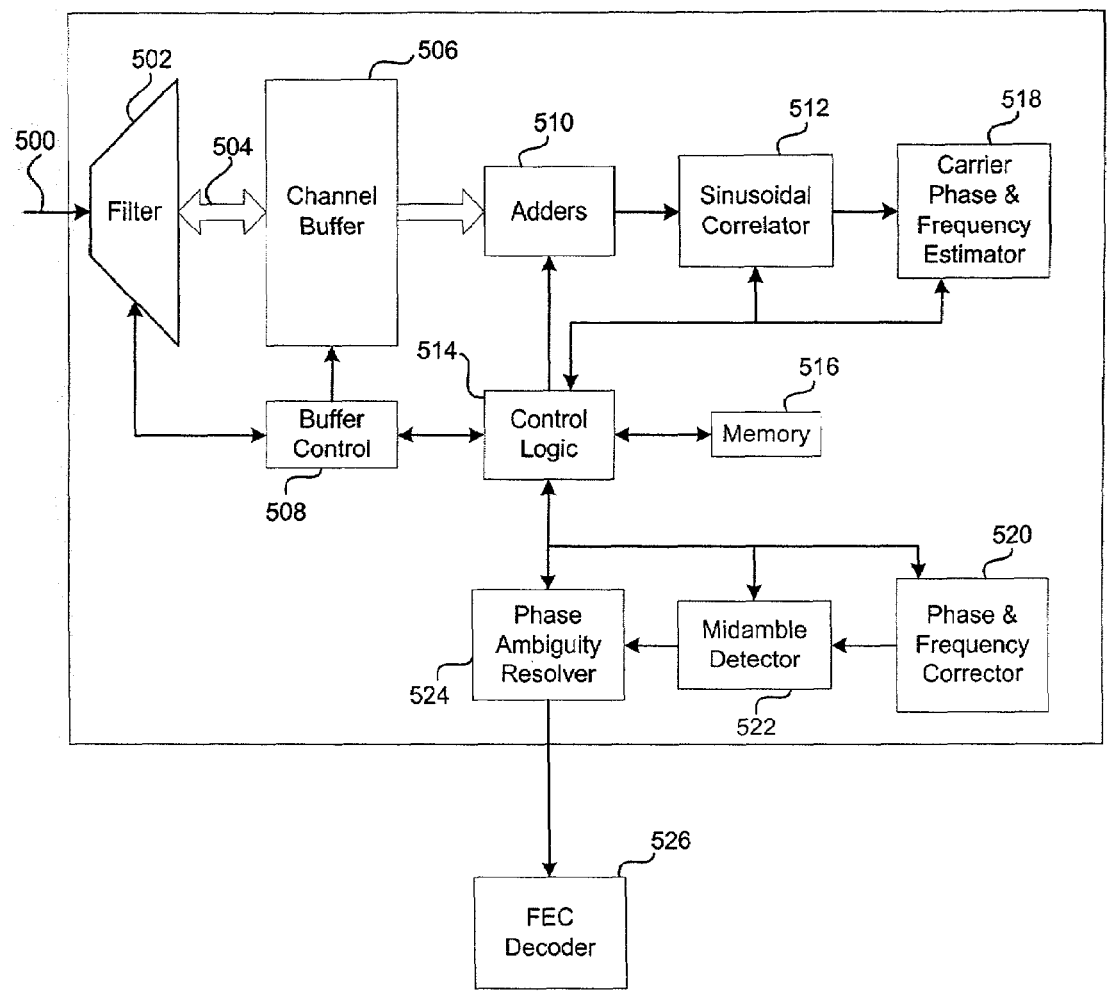
FIG. 5 illustrates a hardware implementation of the disclosed burst processing architecture.

Referring now to FIG. 5, there is illustrated a hardware implementation of the disclosed burst processing architecture. A received burst waveform 500 is filtered using a multi-rate filter 502 (e.g., a polyphase filter). In this particular embodiment, the filter 502 has up to sixteen outputs, which each output operates at 105.46875 Ksps. (Note that filters providing a greater number of outputs may also be implemented in more robust applications.) Further, each channel of the filter 502 is oversampled five times such that the transmit rate for each channel across a bus 504 to a channel buffer 506 is 527.34375 Ksps. This provides a total of 2,560 complex values per channel per time slot or burst. For all sixteen channels this results in 40,960 complex values per channel time slot (i.e., 512 symbols×5 samples/s×16 channels). The total symbol rate for all sixteen channels is 8.4375 Msps. Each of the channels of the filter 502 connect across the bus 504 to the channel buffer 506 such that burst data from each channel of the filter 502 is buffered into respective buffer registers in preparation for further processing. Where the data block comprises 512 symbols, oversampling generates 2,560 samples per channel for buffering in the channel buffer 506. This number of symbol samples is compatible for use with the $(32,26)^2$ TPC. A buffer control block 508 connects to the channel buffer 506 and the filter 502 to control insertion of channel data into the appropriate buffer registers.

The output of the channel buffer 506 connects to an adder block 510 that comprises a number of adder banks (e.g., five banks of adders, in this embodiment). The output of the adder block 510 connects to a sinusoidal correlator block 512 such that the symbol phase can be determined as that which maximizes the square symbol amplitude. (Note that other metrics can be utilized to determine the symbol phase, e.g., symbol amplitude, and symbol variance.) A control logic block 514 connects to many of the blocks for monitor and control thereof. For example, the control logic block 514 processes the square radius for all of the complex samples, which radius information is utilized for determining the burst energy, and normalizing the complex samples. It can be appreciated that the sinusoidal correlator function could be included in the control logic block 514. A memory 516 connects to the control logic 514 for use thereof. For example, the lookup table can be stored therein for use in determining the change in phase angle. This may be a non-volatile memory architecture such that the table data is always available. The control logic 514 uses the normalized data and correlation data from the sinusoidal correlator 512 to perform interpolation to a maximum index value X, and to obtain a fixed number of complex samples (e.g., 512 complex samples) at that optimum index value X. The correlator 512 not only correlates, but also generates symbol timing by interpolating to the appropriate symbol timing points.

The symbol timing information is then utilized by the control logic block 514 to facilitate estimation of the residual carrier frequency and phase in a carrier phase and frequency estimator block 518. The control logic 514 performs a number of operations in preparation for the estimation process, e.g., determining the phase angle change from the lookup table stored in memory 516, pads the 512 samples to 1,024 samples, computes the FFT of the 1,024 samples and the power spectral density.

The control logic block 514 connects to a phase and frequency corrector block 520 such that the interpolation data can be passed thereto along with the phase and frequency data calculated by the estimator 518 so that the phase and frequency can be corrected. The output of the corrector 520 connects to a midamble detector 522 to detect the location of the unique word embedded in the burst data. Once detected, the data is passed to a resolver block 524 to resolve any phase ambiguity before the data is sent to a decoder 526 for FEC decoding (similar to FEC decoder 110 of FIG. 1).

Figure 6:
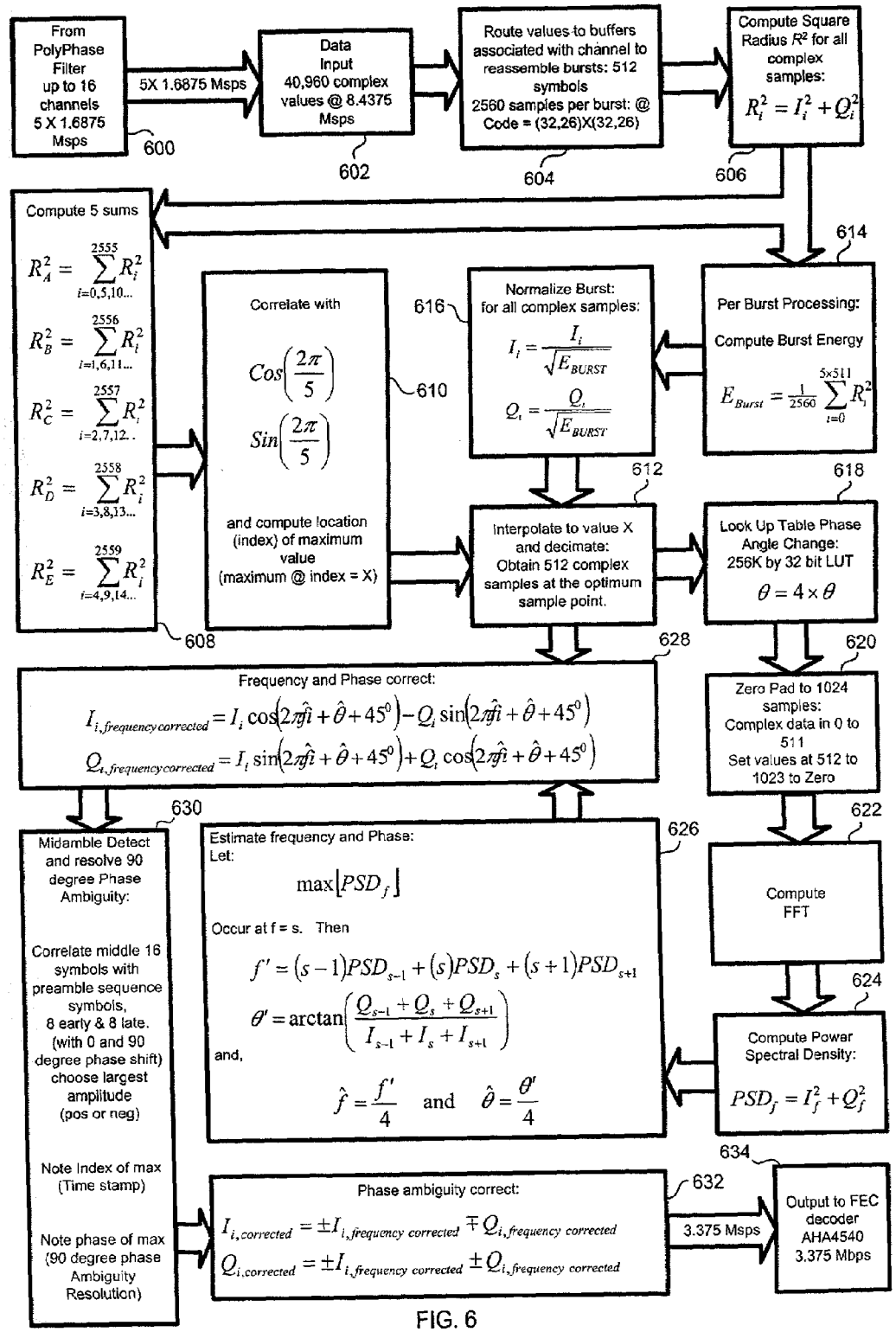
FIG. 6 illustrates a process flow diagram of the disclosed burst processing architecture.

Referring now to FIG. 6, there is illustrated a process flow diagram of the disclosed burst processing architecture. The process begins with a filter 600 sampling the received waveform. The samples are then passed to a data input block 602 where the samples are prepared and forwarded to a router block 604 for input to respective buffers of the channel buffer 506. The control logic 514 then extracts register data samples from the buffer registers and calculates the square radius for the complex samples, as indicated in a block 606. Flow is then to an adder block 608 where the banks of adders 510 are utilized to calculate five sums associated with selected samples of the burst data. Flow continues to a correlation block 610 where 5-point sinusoidal correlation is performed using the correlator 512 to yield the phase relationship for the optimum sampling point.

Once the square radius $R^2$ for all complex values is performed in process block 606, flow is also to energy calculation block 614 where those values are also utilized by the control logic 514 to calculate the burst energy for the 2,560 samples. Flow is then to a normalization block 616 where the control logic 514 performs normalization of the real and complex components of the complex samples. The control logic 514 then uses both the normalized information from the normalization block 616 and the resulting optimum value obtained from the correlation data of the correlation block 610 to perform interpolation and decimation, associated with the interpolation block 612.

Process flow is then to a lookup table block 618 where the control logic 514 accesses the lookup table in the memory 516 (which memory 516 may also be contained in the control logic block 514) and multiplies the result by four, which rotates out the modulation (for QPSK, the design can be modified for 8-PSK by rotating the phase angle by eight). Flow is then to a padding block 620 where the 512 samples (or 528 samples when carrying pad bits) are zero padded to a total of 1,024 samples in preparation for calculating the FFT thereof, in an FFT block 622. Note that the FFT portion could be replaced with, for example, an ARMA (auto regressive moving average) but the FFT approach is very near optimal, and the FFT has been well studied and optimized for hardware as well as software implementation. Additionally, the disclosed method of implementing FFT tolerates greater frequency errors then differential coding schemes, and thus does not suffer the performance losses associated with differential decoding. The control logic 514 then calculates the power spectral density in a PSD block 624. The result is then used in an estimator block 626 where the control logic 514, in conjunction with the estimator 518 (or independently without requiring the estimator logic 518), performs estimation of the residual carrier phase and frequency prior to stripping the carrier signal from the information. The estimated residual carrier phase and frequency information is then passed to a correction block 628 where the output of the interpolation block 612 and the estimator block 626 is utilized for establishing the corrected phase and frequency, which essentially removes the residual carrier signal from the information.

With the residual carrier signal removed, flow is to a midamble-detection-and-phase-ambiguity resolution block 630 where the control logic 514 performs processing with the detector logic 522 (which may also be part of the control logic 514) to arrive at the unique bit pattern contained within the waveform packet. The unique bit pattern is found be correlating the received data with one or more established symbol sequences, and selecting the time offset and phase rotation that generates the maximum positive correlation. Phase ambiguity correction is then performed with the resolver 524 (which may also be part of the control logic 514) in a correction block 632, prior to the information being forwarded to the FEC hardware block 634 for decoding by the decoder 526.

The hardware implementation can be achieved using a FPGA (Field Programmable Gate Array), a DSP (Digital Signal Processor), or combinations thereof, etc., or other architectures that can operate in accordance with the burst processing algorithms disclosed hereinabove.

Although the preferred embodiment has been described in detail, it should be understood that various changes, substitutions and alterations could be made therein without departing from the spirit and scope of the invention as defined by the appended claims.

What is claimed is:

1. A method of processing burst information in a transmission link, comprising the steps of:
    receiving a sampled waveform containing a record of symbols imposed on a carrier signal;
    determining symbol phase of said record of symbols utilizing one or more metrics;
    processing said sample waveform to remove said carrier signal;
    calculating phase ambiguity of the burst information;
    resolving phase ambiguity of said sample waveform using the calculated phase ambiguity; and
    indexing an arrival time of burst information;
    wherein said symbol phase is determined with 5-points of correlation using sinusoidal functions.

2. The method recited in claim 1, further comprising:
    locating a unique bit pattern of symbols in said record, said locating step comprising:
        correlating said record of symbols with one or more predetermined sequences of symbols, and
        selecting correlation parameters associated with a maximum positive correlation of said record of symbols and said one or more predetermined sequences of symbols.

3. The method recited in claim 1, further comprising:
    locating a unique bit pattern of symbols in said record, wherein:
        said unique bit pattern of symbols comprises an extended Hamming code word compatible for use in forward error correction decoding, and
        said locating step comprises:
            correlating said record of symbols with one or more predetermined sequences of symbols, and
            selecting correlation parameters associated with a maximum positive correlation of said record of symbols and said one or more predetermined sequences of symbols.

4. The method recited in claim 1, further comprising:
    locating a unique bit pattern of symbols in said record, said locating step comprising:
        correlating said record of symbols with one or more predetermined sequences of symbols, and
        selecting correlation parameters associated with a maximum positive correlation of said record of symbols and said one or more predetermined sequences of symbols, wherein:
            said correlation parameters comprise a time offset value and a phase rotation value which are used to generate said maximum positive correlation.

5. The method recited in claim 1, wherein:
    said sampled waveform is derived from a single channel per carrier waveform, and
    said single channel comprises a plurality of time slices.

6. The method recited in claim 1, wherein said sampled waveform is derived from a TDMA signal.

7. The method recited in claim 1, wherein the step of processing comprises:
    estimating residual carrier phase and frequency, and
    down-converting to remove said carrier signal.

8. The method recited in claim 1, wherein the step of processing comprises:
    computing a FFT on a block of symbols of said record of symbols, wherein said block of symbols is fixed and padded.

9. The method recited in claim 1, wherein the step of processing comprises:
    computing a FFT on a block of symbols of said record of symbols, wherein said block of symbols is fixed and unpadded.

10. The method recited in claim 1, wherein said carrier signal is transmitted wirelessly.

11. The method recited in claim 1, wherein said carrier signal is transmitted wirelessly as part of a satellite return transmission link.

12. The method recited in claim 1, wherein at least one of said one or more metrics is a maximized square symbol amplitude.

13. The method recited in claim 1, wherein at least one of said one or more metrics is a maximized symbol amplitude.

14. The method recited in claim 1, wherein at least one of said one or more metrics is a minimized symbol variance.

15. An apparatus for processing burst information in a transmission link, comprising:
    a waveform sampler for sampling a received waveform imposed on a carrier signal, said sampled waveform having a record of symbols;
    a determinator for determining symbol phase of said record of symbols utilizing one or more metrics;
    a processor for processing said sampled waveform to remove said carrier signal;
    a resolver for determining phase ambiguity of the burst information; and a detector for detecting a time of arrival of the burst information;
wherein said symbol phase is determined with 5-points of correlation using sinusoidal functions.

16. The apparatus recited in claim 15, further comprising:
a locator for locating a unique bit pattern of symbols in said record, said locator comprising a correlator for correlating said record of symbols with one or more predetermined sequences of symbols; and
a selector for selecting correlation parameters associated with a maximum positive correlation of said record of symbols and said one or more predetermined sequences of symbols.

17. The apparatus recited in claim 15, further comprising:
a locator for locating a unique bit pattern of symbols in said record,
said unique bit pattern of symbols comprises an extended Hamming code word compatible for use in forward error correction decoding, and
said locator comprising a correlator for correlating said record of symbols with one or more predetermined sequences of symbols; and
a selector for selecting correlation parameters associated with a maximum positive correlation of said record of symbols and said one or more predetermined sequences of symbols.

18. The apparatus recited in claim 15, further comprising:
a locator for locating a unique bit pattern of symbols in said record, said locator comprising a correlator for correlating said record of symbols with one or more predetermined sequences of symbols; and
a selector for selecting correlation parameters associated with a maximum positive correlation of said record of symbols and said one or more predetermined sequences of symbols,
wherein said correlation parameters comprise a time offset value and a phase rotation value which are used to generate said maximum positive correlation.

19. The apparatus recited in claim 15, wherein:
said sampled waveform is derived from a single channel per carrier waveform, and
said single channel comprises a plurality of time slices.

20. The apparatus recited in claim 15, wherein said sampled waveform is derived from a TDMA signal.

21. The apparatus recited in claim 15, wherein the processor comprises:
an estimator for estimating residual carrier phase and frequency, and
a demodulator for down-converting to remove said carrier signal.

22. The apparatus recited in claim 15, wherein the step of processing comprises:
computing a FFT on a block of symbols of said record of symbols, wherein said block of symbols is fixed and padded.

23. The apparatus recited in claim 15, wherein the step of processing comprises:
computing a FFT on a block of symbols of said record of symbols, wherein said block of symbols is fixed and unpadded.

24. The apparatus recited in claim 15, wherein said carrier signal is transmitted wirelessly.

25. The apparatus recited in claim 15, wherein said carrier signal is transmitted wirelessly as part of a satellite return transmission link.

26. The apparatus recited in claim 15, wherein at least one of said one or more metrics is a maximized square symbol amplitude.

27. The apparatus recited in claim 15, wherein at least one of said one or more metrics is a maximized symbol amplitude.

28. The apparatus recited in claim 15, wherein at least one of said one or more metrics is a minimized symbol variance.

29. A method of processing burst information in a transmission link, comprising the steps of:
receiving a sampled waveform containing a record of symbols imposed on a carrier signal;
determining symbol timing of said record of symbols utilizing one or more metrics.
processing said sample waveform to remove said carrier signal by:
estimating residual carrier phase and frequency; and
down-converting to remove said carrier signal; and
determining phase ambiguity and burst arrival time by detecting a unique pattern of symbols word in said record of symbols, wherein phase ambiguity of said sample waveform is resolved using the determined phase ambiguity;
wherein symbol phase of said symbol timing is determined with 5-points of correlation using sinusoidal functions.

30. The method recited in claim 29, further comprising:
locating a unique bit pattern of symbols in said record, said locating step comprising:
correlating said record of symbols with one or more predetermined sequences of symbols, and
selecting correlation parameters associated with a maximum positive correlation of said record of symbols and said one or more predetermined sequences of symbols.

31. The method recited in claim 29, further comprising:
locating a unique bit pattern of symbols in said record, wherein:
said unique bit pattern of symbols comprises an extended Hamming code word compatible for use in forward error correction decoding, and
said locating step comprises:
correlating said record of symbols with one or more predetermined sequences of symbols, and
selecting correlation parameters associated with a maximum positive correlation of said record of symbols and said one or more predetermined sequences of symbols.

32. The method recited in claim 29, further comprising:
locating a unique bit pattern of symbols in said record, said locating step comprising:
correlating said record of symbols with one or more predetermined sequences of symbols, and
selecting correlation parameters associated with a maximum positive correlation of said record of symbols and said one or more predetermined sequences of symbols, wherein:
said correlation parameters comprise a time offset value and a phase rotation value which are used to generate said maximum positive correlation.

33. The method recited in claim 29, wherein:
said sampled waveform is derived from a single channel per carrier waveform, and
said single channel comprises a plurality of time slices.

34. The method recited in claim 29, wherein said sampled waveform is derived from a TDMA signal.

35. The method recited in claim 29, wherein the step of processing comprises:
computing a FFT on a block of symbols of said record of symbols, wherein said block of symbols is fixed and padded.

36. The method recited in claim 29, wherein the step of processing comprises:
computing a FFT on a block of symbols of said record of symbols, wherein said block of symbols is fixed and unpadded.

37. The method recited in claim 29, wherein said carrier signal is transmitted wirelessly.

38. The method recited in claim 29, wherein said carrier signal is transmitted wirelessly as part of a satellite return transmission link.

39. The method recited in claim 29, wherein at least one of said one or more metrics is a maximized square symbol amplitude.

40. The method recited in claim 29, wherein at least one of said one or more metrics is a maximized symbol amplitude.

41. The method recited in claim 29, wherein at least one of said one or more metrics is a minimized symbol variance.

42. An apparatus for processing burst information in a transmission link, comprising:
a waveform sampler for sampling a received waveform imposed on a carrier signal, said sampled waveform having a record of symbols;
a determinator of determining symbol timing of said record of symbols utilizing one or more metrics;
a processor for processing said sampled waveform in phase and frequency to remove said carrier signal;
a resolver for resolver phase ambiguity of burst information; and
a detector for detecting a time of arrival of the burst information;
wherein symbol phase of said symbol timing is determined with 5-points of correlation using sinusoidal functions.

43. The apparatus recited in claim 42, further comprising:
a locator for locating a unique bit pattern of symbols in said record, said locator comprising a correlator for correlating said record of symbols with one or more predetermined sequences of symbols; and
a selector for selecting correlation parameters associated with a maximum positive correlation of said record of symbols and said one or more predetermined sequences of symbols.

44. The apparatus recited in claim 42, further comprising:
a locator for locating a unique bit pattern of symbols in said record,
said unique bit pattern of symbols comprises an extended Hamming code word compatible for use in forward error correction decoding, and
said locator comprising a correlator for correlating said record of symbols with one or more predetermined sequences of symbols; and
a selector for selecting correlation parameters associated with a maximum positive correlation of said record of symbols and said one or more predetermined sequences of symbols.

45. The apparatus recited in claim 42, further comprising:
a locator for locating a unique bit pattern of symbols in said record, said locator comprising a correlator for correlating said record of symbols with one or more predetermined sequences of symbols; and
a selector for selecting correlation parameters associated with a maximum positive correlation of said record of symbols and said one or more predetermined sequences of symbols,
wherein said correlation parameters comprise a time offset value and a phase rotation value which are used to generate said maximum positive correlation.

46. The apparatus recited in claim 42, wherein:
said sampled waveform is derived from a single channel per carrier waveform, and
said single channel comprises a plurality of time slices.

47. The apparatus recited in claim 42, wherein said sampled waveform is derived from a TDMA signal.

48. The apparatus recited in claim 42, wherein the processor comprises:
an estimator for estimating residual carrier phase and frequency, and
a demodulator for down-converting to remove said carrier signal.

49. The apparatus recited in claim 42, wherein the step of processing comprises:
computing a FFT on a block of symbols of said record of symbols, wherein said block of symbols is fixed and padded.

50. The apparatus recited in claim 42, wherein the step of processing comprises:
computing a FFT on a block of symbols of said record of symbols, wherein said block of symbols is fixed and unpadded.

51. The apparatus recited in claim 42, wherein said carrier signal is transmitted wirelessly.

52. The apparatus recited in claim 42, wherein said carrier signal is transmitted wirelessly as part of a satellite return transmission link.

53. The apparatus recited in claim 42, wherein at least one of said one or more metrics is a maximized square symbol amplitude.

54. The apparatus recited in claim 42, wherein at least one of said one or more metrics is a maximized symbol amplitude.

55. The apparatus recited in claim 42, wherein at least one of said one or more metrics is a minimized symbol variance.

56. A method of processing burst information in a transmission link, comprising the steps of:
receiving a sampled waveform containing a record of symbols imposed on a carrier signal;
determining symbol timing of said record of symbols utilizing one or more metrics;
processing said sample waveform in phase and frequency to remove said carrier signal;
calculating phase ambiguity of the burst information;
resolving phase ambiguity of said sample waveform using said calculated phase ambiguity; and
indexing an arrival time of the burst information;
wherein symbol phase of said symbol timing is determined in the step of determining with 5-points of correlation using sinusoidal functions.

57. The method recited in claim 56, further comprising:
locating a unique bit pattern of symbols in said record, said locating step comprising:
correlating said record of symbols with one or more predetermined sequences of symbols, and
selecting correlation parameters associated with a maximum positive correlation of said record of symbols and said one or more predetermined sequences of symbols.

58. The method recited in claim 56, further comprising:
locating a unique bit pattern of symbols in said record, wherein:
said unique bit pattern of symbols comprises an extended Hamming code word compatible for use in forward error correction decoding, and said locating step comprises:
correlating said record of symbols with one or more predetermined sequences of symbols, and selecting correlation parameters associated with a maximum positive correlation of said record of symbols and said one or more predetermined sequences of symbols.

59. The method recited in claim 56, further comprising: locating a unique bit pattern of symbols in said record, said locating step comprising:
correlating said record of symbols with one or more predetermined sequences of symbols, and
selecting correlation parameters associated with a maximum positive correlation of said record of symbols and said one or more predetermined sequences of symbols, wherein:
said correlation parameters comprise a time offset value and a phase rotation value which are used to generate said maximum positive correlation.

60. The method recited in claim 56, wherein:
said sampled waveform is derived from a single channel per carrier waveform, and
said single channel comprises a plurality of time slices.

61. The method recited in claim 56, wherein said sampled waveform is derived from a TDMA signal.

62. The method recited in claim 56, wherein the step of processing comprises:
estimating residual carrier phase and frequency, and down-converting to remove said carrier signal.

63. The method recited in claim 56, wherein the step of processing comprises:
computing a FFT on a block of symbols of said record of symbols, wherein said block of symbols is fixed and padded.

64. The method recited in claim 56, wherein the step of processing comprises:
computing a FFT on a block of symbols of said record of symbols, wherein said block of symbols is fixed and unpadded.

65. The method recited in claim 56, wherein said carrier signal is transmitted wirelessly.

66. The method recited in claim 56, wherein said carrier signal is transmitted wirelessly as part of a satellite return transmission link.

67. The method recited in claim 56, wherein at least one of said one or more metrics is a maximized square symbol amplitude.

68. The method recited in claim 56, wherein at least one of said one or more metrics is a maximized symbol amplitude.

69. The method recited in claim 56, wherein at least one of said one or more metrics is a minimized symbol variance.

70. A method of processing burst information in a transmission link, comprising the steps of:
receiving a sampled waveform containing a record of symbols imposed on a carrier signal;
determining symbol timing of said record of symbols utilizing one or more metrics;
processing said sample waveform to remove said carrier signal; and
calculating phase ambiguity and time of arrival of the burst information by midamble detection, wherein phase ambiguity of said sample waveform is resolved using the calculated phase ambiguity;
wherein symbol phase of said symbol timing is determined in the step of determining with 5-points of correlation using sinusoidal functions.

71. The method recited in claim 70, further comprising: locating a unique bit pattern of symbols in said record, said locating step comprising:
correlating said record of symbols with one or more predetermined sequences of symbols, and
selecting correlation parameters associated with a maximum positive correlation of said record of symbols and said one or more predetermined sequences of symbols.

72. The method recited in claim 70, further comprising: locating a unique bit pattern of symbols in said record, wherein:
said unique bit pattern of symbols comprises an extended Hamming code word compatible for use in forward error correction decoding, and
said locating step comprises:
correlating said record of symbols with one or more predetermined sequences of symbols, and
selecting correlation parameters associated with a maximum positive correlation of said record of symbols and said one or more predetermined sequences of symbols.

73. The method recited in claim 70, further comprising: locating a unique bit pattern of symbols in said record, said locating step comprising:
correlating said record of symbols with one or more predetermined sequences of symbols, and
selecting correlation parameters associated with a maximum positive correlation of said record of symbols and said one or more predetermined sequences of symbols, wherein:
said correlation parameters comprise a time offset value and a phase rotation value which are used to generate said maximum positive correlation.

74. The method recited in claim 70, wherein:
said sampled waveform is derived from a single channel per carrier waveform, and
said single channel comprises a plurality of time slices.

75. The method recited in claim 70, wherein said sampled waveform is derived from a TDMA signal.

76. The method recited in claim 70, wherein the step of processing comprises:
estimating residual carrier phase and frequency, and down-converting to remove said carrier signal.

77. The method recited in claim 70, wherein the step of processing comprises:
computing a FFT on a block of symbols of said record of symbols, wherein said block of symbols is fixed and padded.

78. The method recited in claim 70, wherein the step of processing comprises:
computing a FFT on a block of symbols of said record of symbols, wherein said block of symbols is fixed and unpadded.

79. The method recited in claim 70, wherein said carrier signal is transmitted wirelessly.

80. The method recited in claim 70, wherein said carrier signal is transmitted wirelessly as part of a satellite return transmission link.

81. The method recited in claim 70, wherein at least one of said one or more metrics is a maximized square symbol amplitude.

82. The method recited in claim 70, wherein at least one of said one or more metrics is a maximized symbol amplitude.

83. The method recited in claim 70, wherein at least one of said one or more metrics is a minimized symbol variance.

* * * * *